(12) United States Patent
Djugash (10) Patent No.: US 10,217,379 B2
(45) Date of Patent: Feb. 26, 2019

(54) MODIFYING VISION-ASSIST DEVICE PARAMETERS BASED ON AN ENVIRONMENT CLASSIFICATION

(71) Applicant: Toyota Motor Engineering & Manufacturing North America, Inc., Erlanger, KY (US)

(72) Inventor: Joseph M. A. Djugash, San Jose, CA (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 14/609,986

(22) Filed: Jan. 30, 2015

(65) Prior Publication Data

US 2016/0225287 A1 Aug. 4, 2016

(51) Int. Cl.
*G09B 21/00* (2006.01)
*G02B 27/01* (2006.01)
*G06K 9/00* (2006.01)
*G06F 9/50* (2006.01)

(52) U.S. Cl.
CPC ......... *G09B 21/008* (2013.01); *G02B 27/017* (2013.01); *G06F 9/50* (2013.01); *G06K 9/00624* (2013.01); *G09B 21/006* (2013.01); *G09B 21/007* (2013.01); *G02B 2027/0178* (2013.01); *G05B 2219/25084* (2013.01)

(58) Field of Classification Search
CPC .. G09B 21/008; G09B 21/006; G09B 21/007; G02B 27/017; G02B 2027/0178
USPC .......................................................... 348/62
See application file for complete search history.

(56) References Cited

U.S. PATENT DOCUMENTS

| | | |
|---|---|---|
| 6,542,809 B2 | 4/2003 | Hehls, III |
| 6,554,987 B1 | 4/2003 | Gilchrist et al. |
| 6,710,706 B1 | 3/2004 | Withington et al. |
| 7,336,226 B2 | 2/2008 | Jung et al. |
| 7,751,937 B2 | 7/2010 | Sabe et al. |
| 7,778,732 B2 | 8/2010 | Adachi et al. |
| 7,840,326 B1 | 11/2010 | Yamada |
| 8,063,929 B2 | 11/2011 | Kurtz et al. |

(Continued)

FOREIGN PATENT DOCUMENTS

| | | |
|---|---|---|
| EP | 2363251 A1 | 9/2011 |
| WO | 2012104626 A1 | 8/2012 |

OTHER PUBLICATIONS

Takayuki Kanda, et al., Who will be the customer? A social robot that anticipates people's behavior from their trajectories, UbiComp '08 Proceedings of the 10th International Conference of Ubiquitous Computing, ACM. Sep. 21, 2008; ISBN:978-1-60558-136-1.

*Primary Examiner* — Jamie J Atala
*Assistant Examiner* — James T Boylan
(74) *Attorney, Agent, or Firm* — Dinsmore & Shohl LLP (57) ABSTRACT

A vision-assist device may include one or more sensors configured to generate data corresponding to one or more objects present in an environment, and a processor communicatively coupled to the one or more sensors. The processor is programmed to identify one or more objects present in the environment based on the data generated by the one or more sensors, classify the environment based on the one or more identified objects, and modify at least one parameter of the vision-assist device based on the classification of the environment.

20 Claims, 8 Drawing Sheets

(56) References Cited

U.S. PATENT DOCUMENTS

| | | |
|---|---|---|
| 8,140,188 B2 | 3/2012 | Takemitsu et al. |
| 8,154,578 B2 | 4/2012 | Kurtz et al. |
| 8,154,583 B2 | 4/2012 | Kurtz et al. |
| 8,159,519 B2 | 4/2012 | Kurtz et al. |
| 8,237,771 B2 | 8/2012 | Kurtz et al. |
| 8,253,770 B2 | 8/2012 | Kurtz et al. |
| 8,274,544 B2 | 9/2012 | Kurtz et al. |
| 8,325,263 B2 | 12/2012 | Kato et al. |
| 8,438,127 B2 | 5/2013 | Kurata et al. |
| 8,442,714 B2 | 5/2013 | Matsukawa et al. |
| 8,467,133 B2 | 6/2013 | Miller |
| 8,660,734 B2 | 2/2014 | Zhu et al. |
| 8,706,298 B2 | 4/2014 | Goulding |
| 8,825,488 B2 | 9/2014 | Scrobbins, II et al. |
| 8,850,597 B1* | 9/2014 | Gates ................. G06F 17/30528 726/26 |
| 8,929,612 B2 | 1/2015 | Ambrus et al. |
| 9,171,380 B2* | 10/2015 | Lee ................. H04N 5/23219 |
| 2005/0096839 A1 | 5/2005 | Nakano et al. |
| 2007/0153091 A1 | 7/2007 | Watlington et al. |
| 2007/0279494 A1 | 12/2007 | Aman et al. |
| 2009/0190797 A1* | 7/2009 | McIntyre ........... G06F 17/30247 382/103 |
| 2011/0238212 A1 | 9/2011 | Shirado et al. |
| 2012/0053826 A1* | 3/2012 | Slamka ................. G01S 19/14 701/301 |
| 2012/0127291 A1* | 5/2012 | Mahoney ............... A61H 3/061 348/62 |
| 2012/0143808 A1* | 6/2012 | Karins ................. G06N 7/005 706/46 |
| 2012/0309407 A1* | 12/2012 | Cazier ................. G01S 5/0257 455/456.1 |
| 2013/0007662 A1* | 1/2013 | Bank ..................... G06F 9/4443 715/811 |
| 2013/0028443 A1* | 1/2013 | Pance ..................... G06F 3/167 381/107 |
| 2013/0115579 A1 | 5/2013 | Taghavi |
| 2013/0127980 A1* | 5/2013 | Haddick ................ G06F 3/013 348/14.08 |
| 2013/0170752 A1 | 7/2013 | Ramnath Krishman et al. |
| 2013/0261796 A1 | 10/2013 | Park |
| 2013/0272548 A1 | 10/2013 | Visser et al. |
| 2013/0326209 A1* | 12/2013 | Dommalapati ....... G06F 9/4421 713/100 |
| 2014/0019522 A1 | 1/2014 | Weng et al. |
| 2014/0055229 A1 | 2/2014 | Amedi et al. |
| 2014/0057232 A1 | 2/2014 | Wetmore et al. |
| 2014/0101757 A1* | 4/2014 | Gnesda ................ G06F 21/562 726/22 |
| 2014/0126877 A1 | 5/2014 | Crawford et al. |
| 2014/0160250 A1 | 6/2014 | Pomerantz et al. |
| 2014/0161345 A1* | 6/2014 | Djugash ................ G06T 7/0042 382/153 |
| 2014/0184384 A1 | 7/2014 | Zhu et al. |
| 2014/0199041 A1 | 7/2014 | Blanco et al. |
| 2014/0247206 A1* | 9/2014 | Grokop ................ G06F 1/3287 345/156 |
| 2015/0002808 A1* | 1/2015 | Rizzo, III ................. A61F 9/08 351/158 |
| 2015/0063713 A1* | 3/2015 | Yang ..................... G06K 9/6267 382/225 |
| 2015/0278224 A1* | 10/2015 | Jaber ................. G06F 17/30247 707/749 |
| 2015/0358594 A1* | 12/2015 | Marshall ................. G06F 3/013 345/419 |
| 2017/0153331 A1* | 6/2017 | Gum ..................... G01S 19/34 |

* cited by examiner

FIG. 8

MODIFYING VISION-ASSIST DEVICE PARAMETERS BASED ON AN ENVIRONMENT CLASSIFICATION

TECHNICAL FIELD

The present specification generally relates to visual-assist devices and, more specifically, visual-assist devices capable of automatically adjusting one or more device parameters based on an environment classification.

BACKGROUND

Blind or visually impaired persons may find it difficult to navigate within their environment because of their inability to detect the location and type of objects within their environment. Although computer-based aid devices are able to provide information to the visually impaired person, such as navigation instructions or information regarding an object present in the environment, certain means of providing information to the visually impaired person may be inappropriate in a particular environment. For example, a volume suitable for providing information in one type of environment (such as a retail environment) may differ from the volume suitable for providing information in a different type of environment (such as a movie theater). Therefore, one or more parameters for the aid device may need to be altered depending on the environment in which the device is being utilized.

Accordingly, a need exists for alternative vision-assist devices for blind or visually impaired persons.

SUMMARY

In one embodiment, a vision-assist device includes one or more sensors configured to generate data corresponding to one or more objects present in an environment and a processor. The processor is programmed to identify the one or more objects present in the environment based on the data generated by the one or more sensors, classify the environment based on the one or more identified objects, and modify at least one parameter of the vision-assist device based on the classification of the environment.

In another embodiment, a vision-assist device includes a first sensor, a second sensor, and a processor. The first sensor includes an image sensor configured to generate image data corresponding to an environment. The second sensor is configured to generate data corresponding to the environment. The processor is programmed to identify a first object and a second object present in the environment based on the image data, classify the environment based on the first and second objects, and modify at least one parameter of the vision-assist device based on the classification of the environment. The processor is programmed to classify the environment based on the first and second objects using an object correlation algorithm and the data generated by the second sensor.

In yet another embodiment, a vision-assist device includes an image sensor configured to generate image data corresponding to an environment, a location sensor configured to generate location data corresponding to the environment, an audio device, a tactile feedback device, and a processor. The processor is programmed to identify a first and second object present in the environment based on the image data, identify a preliminary classification of the environment based on the first and second objects using an object correlation algorithm, and modify a setting of the audio device or the tactile feedback device based on the preliminary classification of the environment.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to vision-assist devices for helping blind or visually impaired individuals navigate their environment. Generally, embodiments described herein may be configured as devices that capture data regarding the user's environment using one or more sensors (e.g., one or more image sensors, location sensors, inertial measurement units, microphones, or the like), classify the user's environment based on the captured data, and adjust one or more parameters of the device. The adjustable parameters can be, for example, a frequency of notifications provided to the user, an allocation of processing capacity, a prioritization of processing, or a setting of an output mechanism, such as an audio device or a tactile feedback device. Because suitable parameters in one environment may not be suitable in another environment, the embodiments described herein classify the environment according to the captured data and apply parameters associated with the environment classification. In this manner, parameters of device operation can be automatically adjusted based on the classification of the environment.

As a non-limiting example, the vision-assist device may detect that the user is in a retail environment, and may therefore increase the volume of an audio device associated with the vision-assist device. The vision-assist device may then detect, for example, that the user has entered a movie theater, and may therefore mute the audio device and turn on a tactile feedback device associated with the vision-assist device. As described in more detail below, other parameters of the vision-assist device can be adjusted depending on the particular embodiment and the classification of the environment. Various embodiments of vision-assist devices and methods of classifying environments and adjusting parameters in response to the classification are described herein.

Figure 1:
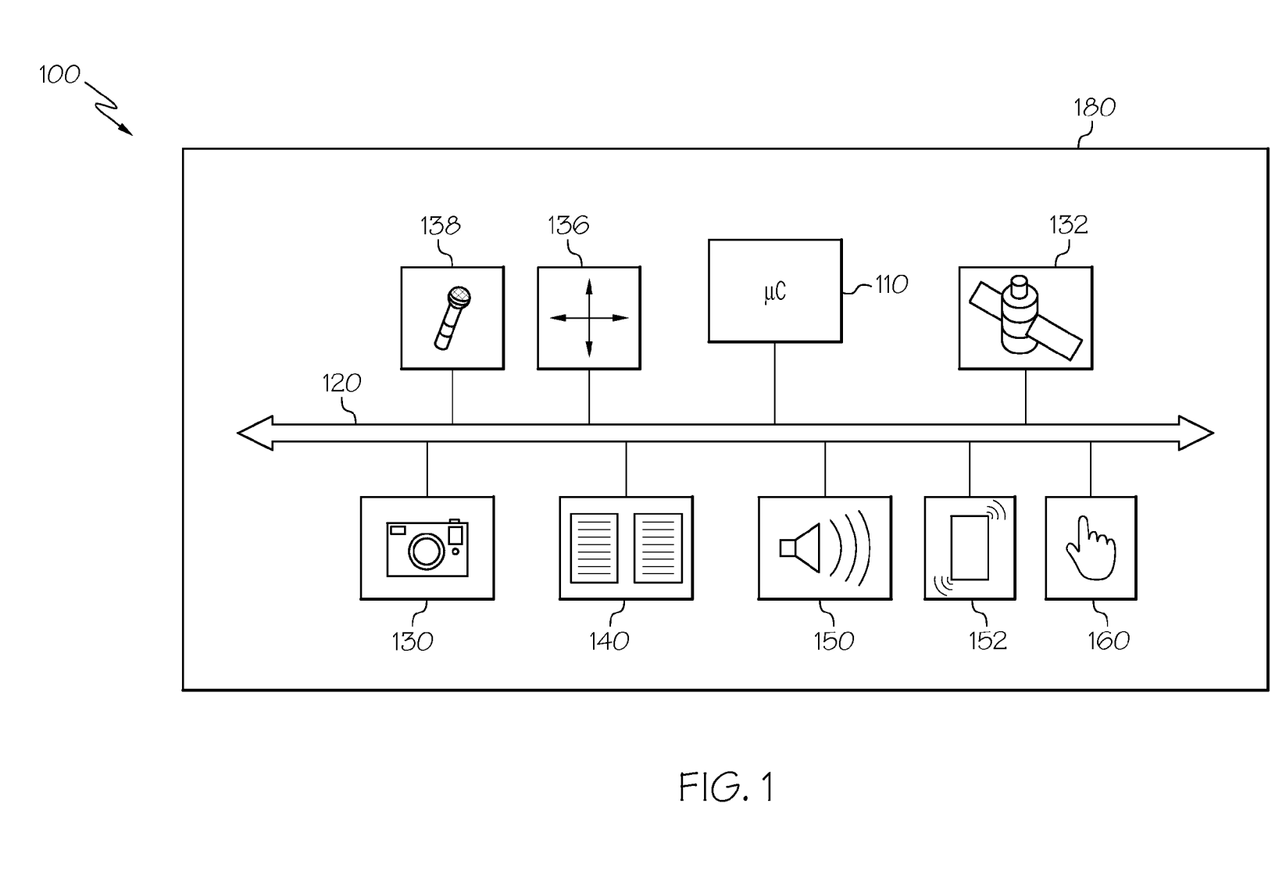
FIG. 1 schematically depicts a vision-assist device according to one or more embodiments shown and described herein.

Referring now to FIG. 1, a vision-assist device 100 is schematically depicted. The vision-assist device 100 comprises a housing 180 in or on which internal components such as one or more processors 110, one or more memory components 140 storing computer-readable instructions, one or more audio devices 150, a tactile feedback device 152, and one or more user input devices 160 are disposed. As described in more detail below, the housing 180 may take on any configuration and, in some embodiments, may be configured to be worn by the user, thereby freeing the user's hands as he or she operates the vision-assist device 100.

The memory component 140 may be configured as a volatile and/or nonvolatile non-transitory computer readable medium and, as such, may include random access memory (including SRAM, DRAM, and/or other types of random access memory), flash memory, registers, compact discs (CD), digital versatile discs (DVD), magnetic disks, and/or other types of storage components. Additionally, the memory component 140 may be configured to store, among other things, operation logic, object recognition logic, object correlation logic, and auditory message generation logic, as described in more detail below. The memory component 140 may also store data, such as data captured by the one or more sensors or externally acquired data, for performing the environment classification described hereinbelow.

A local interface 120 is also included in FIG. 1 and may be implemented as a bus or other interface to facilitate communication among components of the vision-assist device 100. Although not depicted in FIG. 1, the vision-assist device may also include one or more network interface modules, to connect the vision-assist device to a remote computing device or a remote computer network. The network interface module may include any wired or wireless networking hardware, such as a modem, LAN port, wireless fidelity (Wi-Fi) card, WiMax card, mobile communications hardware, and/or other hardware for communicating with other networks and/or devices.

The one or more processors 110 may include any processing component configured to receive information and execute instructions, such as from the memory component 140. Accordingly, the one or more processors 110 may be a controller, an integrated circuit, a microchip, a computer, or any other computing device. The one or more processors 110 are communicatively coupled to the other components of the vision-assist device 100 by the local interface 120. Accordingly, the local interface 120 may communicatively couple any number of processors with one another, and allow the components coupled to the local interface 120 to operate in a distributed computing environment. Specifically, each of the components may operate as a node that may send and/or receive data.

The vision-assist device 100 further includes one or more sensors. The sensors can include, for example, an image sensor 130, a location sensor 132, an accelerometer, a gyroscope, an inertial measurement unit 136, a microphone 138, or the like. The accelerometer and the gyroscope may be part of the inertial measurement unit 136, as described hereinbelow, or may be standalone sensors, depending on the particular embodiment.

The image sensor 130 is configured to capture image data of the environment (i.e., scene) in which the vision-assist device 100 operates. The image data digitally represents the scene in which the vision-assist device 100 operates, such as objects and people within the scene. The image sensor 130 may be configured as any sensor operable to capture image data, such as a camera, a charged-coupled device image sensor or complementary metal-oxide-semiconductor sensor capable of detecting optical radiant having wavelengths in the visual spectrum. The image sensor 130 may be configured to detect optical radiation wavelengths outside of the visual spectrum, such as wavelengths within the infrared spectrum. In some embodiments, multiple image sensors 130 are provided to create stereo image data capable of providing depth information. When the image sensor 130 is configured as a camera, the camera may have any resolution, and may be an omni-directional camera or a panoramic camera. In some embodiments, the one or more optical components, such as a mirror, fish-eye lens, or any other type of lens may be optically coupled to the camera. In some embodiments, a first camera and a second camera may be utilized to produce a stereoscopic image for providing depth information. Various embodiments include one or more imaging sensors, but it should be understood that some embodiments may not include an imaging sensor.

The location sensor 132 is coupled to the local interface 120 and communicatively coupled to the one or more processors 110. The location sensor 132 is capable of generating an output indicative of a location. In some embodiments, the vision-assist device 100 includes a GPS sensor or another sensor capable of generating an output indicative of location. Some embodiments may not include a location sensor 132, such as embodiments in which the vision-assist device 100 does not determine a location of the vision-assist device 100 or embodiments in which the location is determined in other ways (e.g., based on information received from the image sensor 130, the microphone 138, the network interface hardware, the inertial measurement unit 136 or the like). The location sensor 132 may also be configured as a wireless signal detection device capable of triangulating a location of the vision-assist device 100 and the user by way of wireless signals received from one or more wireless antennas.

The inertial measurement unit 136 is coupled to the local interface 120 and communicatively coupled to the one or more processors 110. The inertial measurement unit 136 may include one or more accelerometers and one or more gyroscopes. The inertial measurement unit 136 transforms sensed physical movement of the vision-assist device 100 into a signal indicative of an orientation, a rotation, a velocity, or an acceleration of the vision-assist device 100. As an example and not a limitation, the environment classification can take into account inertial measurement information to distinguish between a user on a train and a user on a bus. Some embodiments of the vision-assist device 100 may not include the inertial measurement unit 136, such as embodiments that include an accelerometer but not a gyroscope, embodiments that include a gyroscope but not an accelerometer, or embodiments that include neither an accelerometer nor a gyroscope.

Still referring to FIG. 1, the microphone 138 is coupled to the local interface 120 and communicatively coupled to the one or more processors. The microphone 138 may be any device capable of transforming a mechanical vibration associated with sound into an electrical signal indicative of the sound. The microphone 138 may be used as an input device 160 to perform tasks, such as navigate menus, input settings and parameters, and any other tasks. It should be understood that some embodiments may not include the microphone 138.

The one or more audio devices 150 may be configured as speakers capable of receiving auditory signals from the one or more processors 110 (either directly or indirectly from other hardware, such as amplifiers, drivers, digital-to-analog converters, and the like) to produce auditory messages capable of being heard by the user. In some embodiments, the one or more audio devices 150 include a first speaker and a second speaker so that the auditory message is provided to the user in stereo.

The tactile feedback device 152 is coupled to the local interface 120 and communicatively coupled to the one or more processors 110. The tactile feedback device 152 may be any device capable of providing tactile feedback to a user. The tactile feedback device 152 may include a vibration device (such as in embodiments in which tactile feedback is delivered through vibration), an air blowing device (such as in embodiments in which the tactile feedback is delivered through a puff of air), or a pressure generating device (such as in embodiments in which the tactile feedback is delivered through generated pressure). It should be understood that some embodiments may not include the tactile feedback device 152.

The one or more user input devices 160 are provided for the user to communicate with the vision-assist device 100. The one or more user input devices 160 may be any device capable of transforming user contact into a data signal that can be transmitted over the local interface 120 such as, for example, a keyboard, buttons, switches, knobs, touch-sensitive pads, microphones, and the like. In some embodiments, the one or more user input devices 160 may include a power button, a volume button, an activation button, a scroll button, or the like. The one or more user input devices 160 may be used by the user to complete tasks such as program preferences or settings, provide commands, provide feedback to the vision-assist device 100, navigate menus, make selections, and other functionality described herein. Any appropriate user input device may be utilized and may be disposed on any surface of the housing 180. It should be understood that some embodiments may not include the user input devices 160.

It should be understood that the vision-assist device 100 may include additional components not illustrated in FIG. 1, such as a power source, voltage regulators, analog-to-digital converters, digital-to-analog converters, drivers, signal conditioning circuits, electromagnetic filtering circuits, lights, proximity sensors, temperature sensors, and the like.

Figure 2:
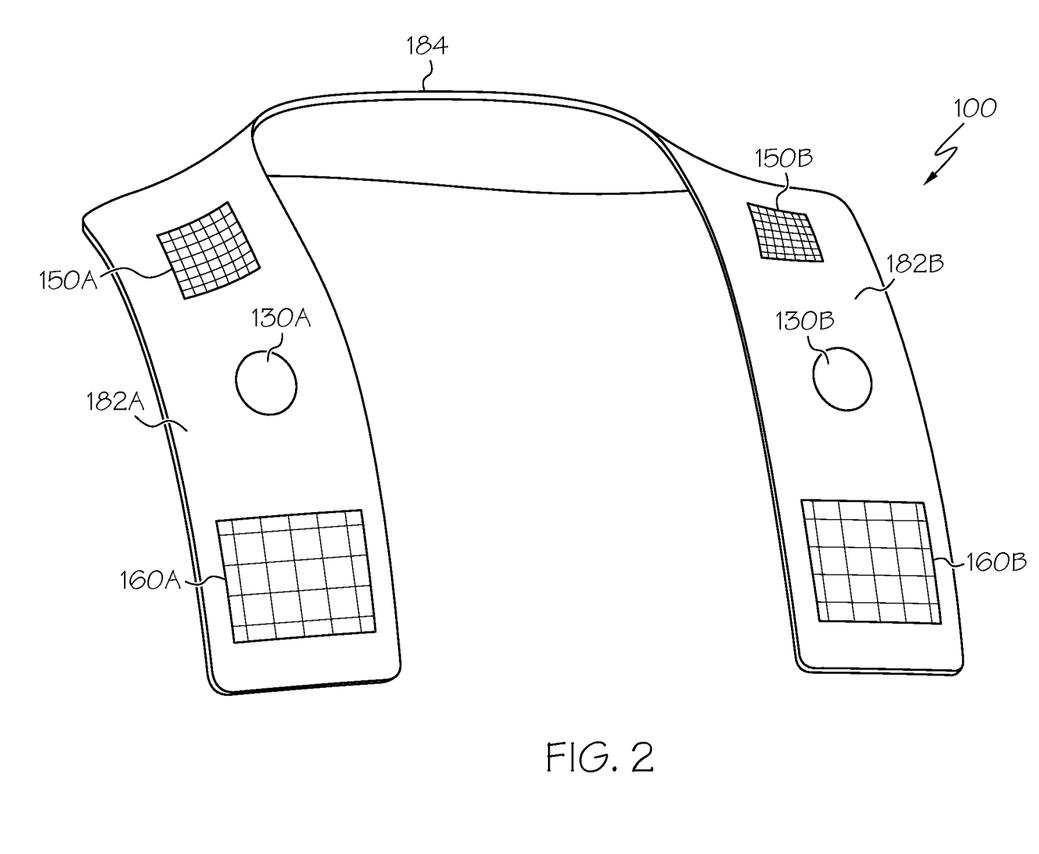
FIG. 2 schematically depicts a vision-assist device configured to be worn around the neck of a user according to one or more embodiments shown and described herein.
Figure 3:
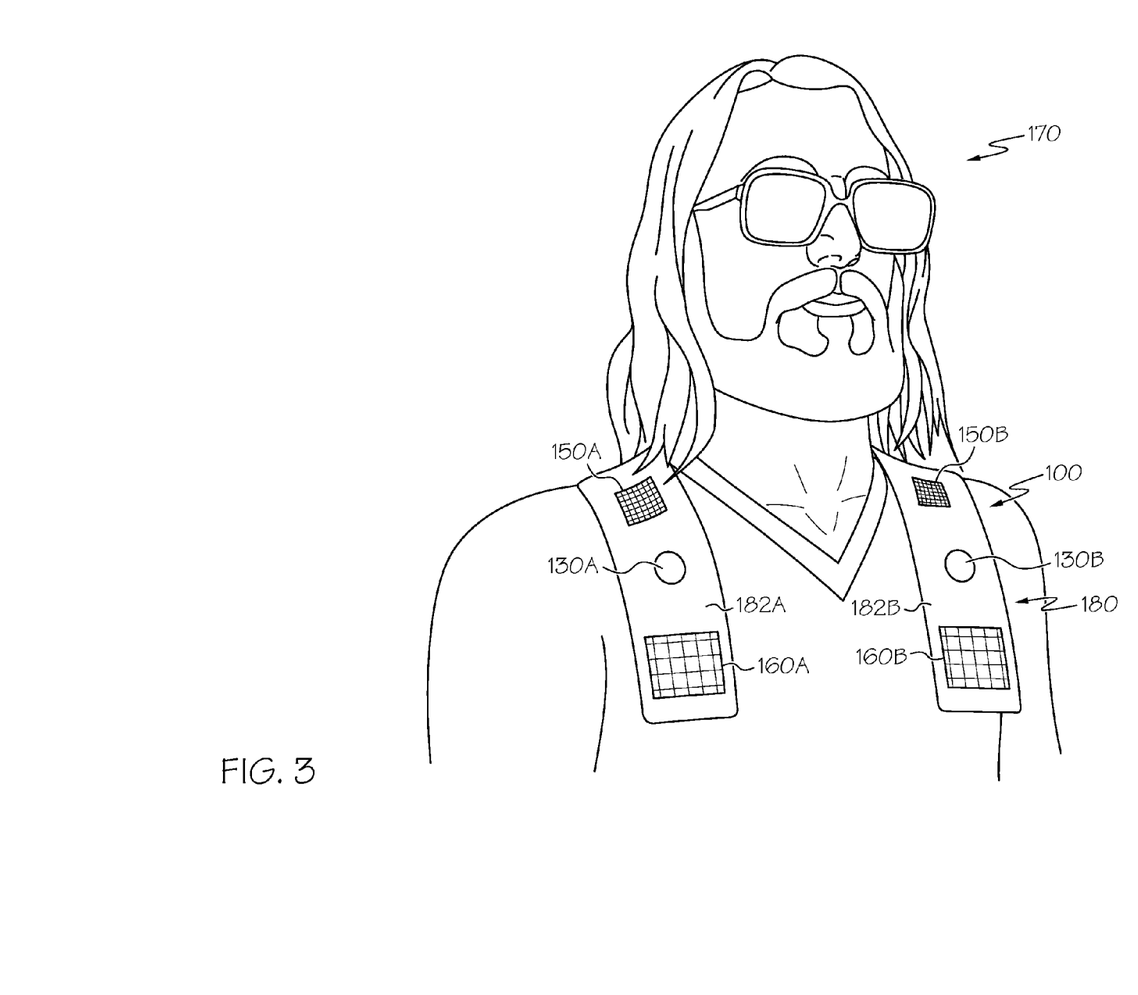
FIG. 3 schematically depicts the vision-assist device of FIG. 2 as worn by a user according to one or more embodiments shown and described herein.

Referring now to FIGS. 2 and 3, a non-limiting example vision-assist device 100 is schematically depicted. FIG. 2 illustrates the example vision-assist device 100 without a user, while FIG. 3 illustrates the example vision-assist device of FIG. 2 worn by a user 170. Referring generally to both FIGS. 2 and 3, the example vision-assist device 100 has a necklace configuration intended to be worn around the neck of the user 170. The housing 180 of the vision-assist device 100 defines a neck portion 184, a first chest portion 182A, and a second chest portion 182B. It should be understood that the housing 180 may be configured differently than what is illustrated in FIGS. 2 and 3, and that the housing 180 may take on different shapes and sizes in other embodiments.

In some embodiments, the housing 180 is made from a pliable material, such as, without limitation, ethylene-vinyl acetate. In other embodiments, the housing 180 is made from a rigid material.

Referring specifically to FIG. 3, the vision-assist device 100 is configured to be worn around the neck of the user 170 such that the neck portion 184 contacts, or is in close proximity to, the back of the user's neck. The first and second chest portions 182A, 182B are draped over the user's chest. In the illustrated example of FIGS. 2 and 3, the first chest portion 182A includes a first audio device 150A, a first image sensor 130A, and a first user input device 160A configured as a touch-sensitive pad or a plurality of buttons. Similarly, the second chest portion 182B includes a second audio device 150B, a second image sensor 130B, and a second user input device 160B. It should be understood that the arrangement of the various components within the housing 180 of the vision-assist device 100 are for illustrative purposes only, and that more or fewer components may be provided, or arranged in a manner that is different from the arrangement depicted in FIG. 3. As a non-limiting, alternative arrangement, only one of the first or second chest portions 182A, 182B may include a user input device.

The first and second image sensors 130A, 130B are configured to capture image data to produce three-dimensional images of the scene as the user navigates the environment that are used by the object recognition algorithm(s) to detect objects and people, as described hereinbelow, which are in turn used to determine a classification for the environment of the user. As shown in FIG. 3, the first and second image sensors 130A, 130B are disposed within the first and second chest portions 182A, 182B such that they are forward-facing and capture image data of the scene directly in front of the user. In other embodiments, one or more additional image sensors may be disposed within the housing 180 to provide image data in directions other than in front of the user 170, such as to the right, left, and/or rear of the user 170.

The first and second audio devices 150A, 150B produce auditory messages that are intended to be received by the user 170. The auditory messages may provide menu navigation options to the user to that the user may program or otherwise set parameters of the vision-assist device 100. Auditory messages may also include environmental information about the scene, as described in detail below. Although two audio devices are shown, more or fewer audio devices may be provided. In some embodiments, a microphone is also provided as a user-input device to enable voice control of the vision-assist device 100. In this manner, the user may provide feedback to the vision-assist device 100 using voice commands. As an example and not a limitation, first and/or second audio device 150A, 150B may be configured as a combination speaker/microphone device capable of both receiving voice commands and emitting auditory messages/sounds.

Figure 4:
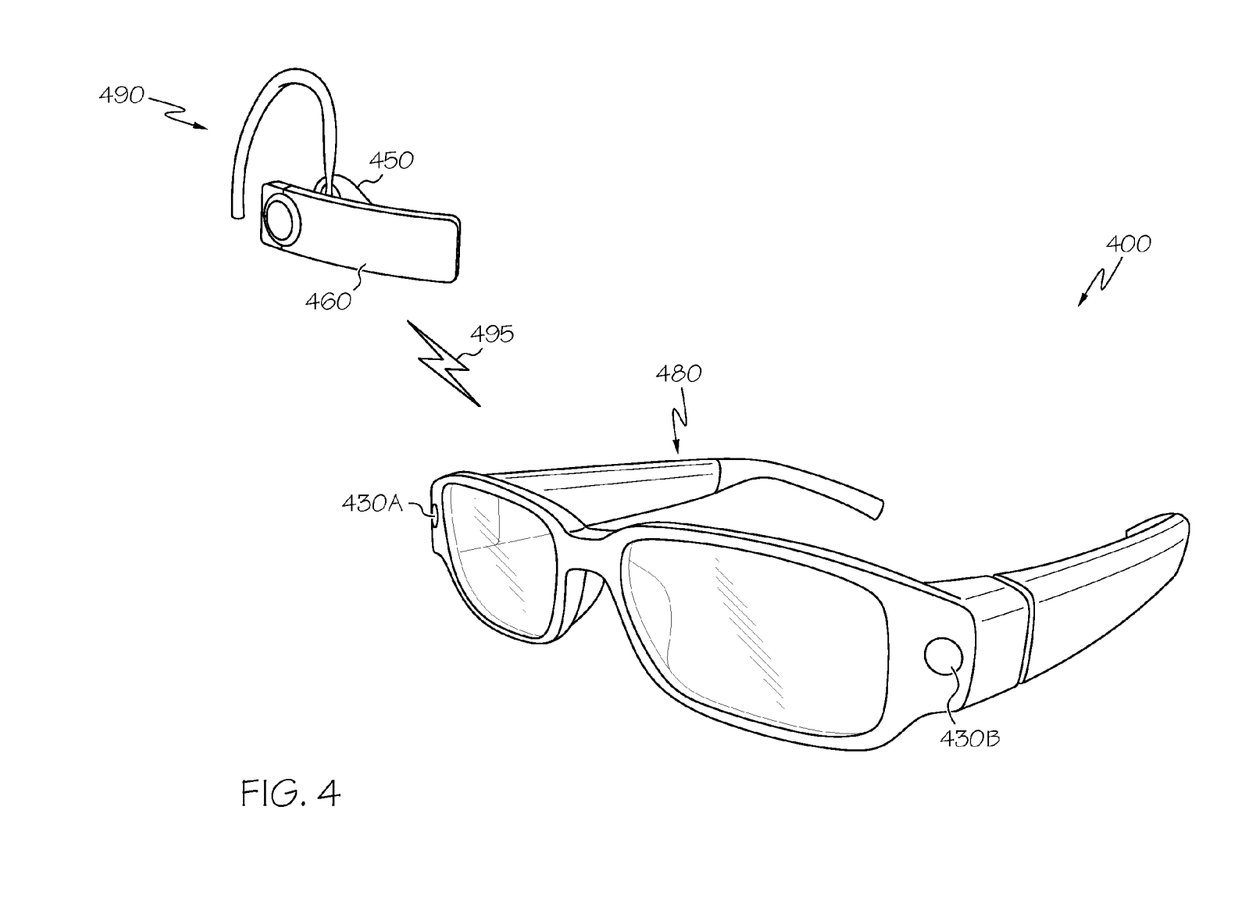
FIG. 4 schematically depicts a vision-assist device configured as eyeglasses according to one or more embodiments shown and described herein.

Referring now to FIG. 4, an example vision-assist device 400 configured as eyeglasses is schematically depicted. In this example, a housing 480 is configured as an eyeglass frame operable to be worn by the user. First and second forward-facing image sensor devices 430A, 430B are disposed on or within respective ends of the housing 480. As stated above, the image sensor devices 430A, 430B are configured as any device capable of capturing image data of a scene. The one or more processors (not shown) and other hardware may be disposed within the housing 480.

The illustrated vision-assist device 400 further includes an earpiece 490 configured to be worn around the ear of a user.

The earpiece includes an audio device 450 that is inserted into the user's ear and produces the auditory messages described herein. The example earpiece 490 further includes a microphone 460 as a user input device for inputting information into the vision-assist device 400 (i.e., voice controls). Accordingly, the earpiece 490 acts as an input/output device for the vision-assist device 400. As shown by symbol 495, the earpiece 490 may be in wireless communication with the components (e.g., the processor) within the housing 480. In other embodiments, the earpiece 490 is integrated into the eyeglass frame housing 480.

Although the vision-assist device 100 has been described as being implemented as a necklace or eyeglasses, it should be understood that the vision-assist device 100 may be implemented in any suitable form. For example, the vision-assist device may take the form of a wristband or watch, a phone, a brooch, a robot, or the like.

Figure 5:
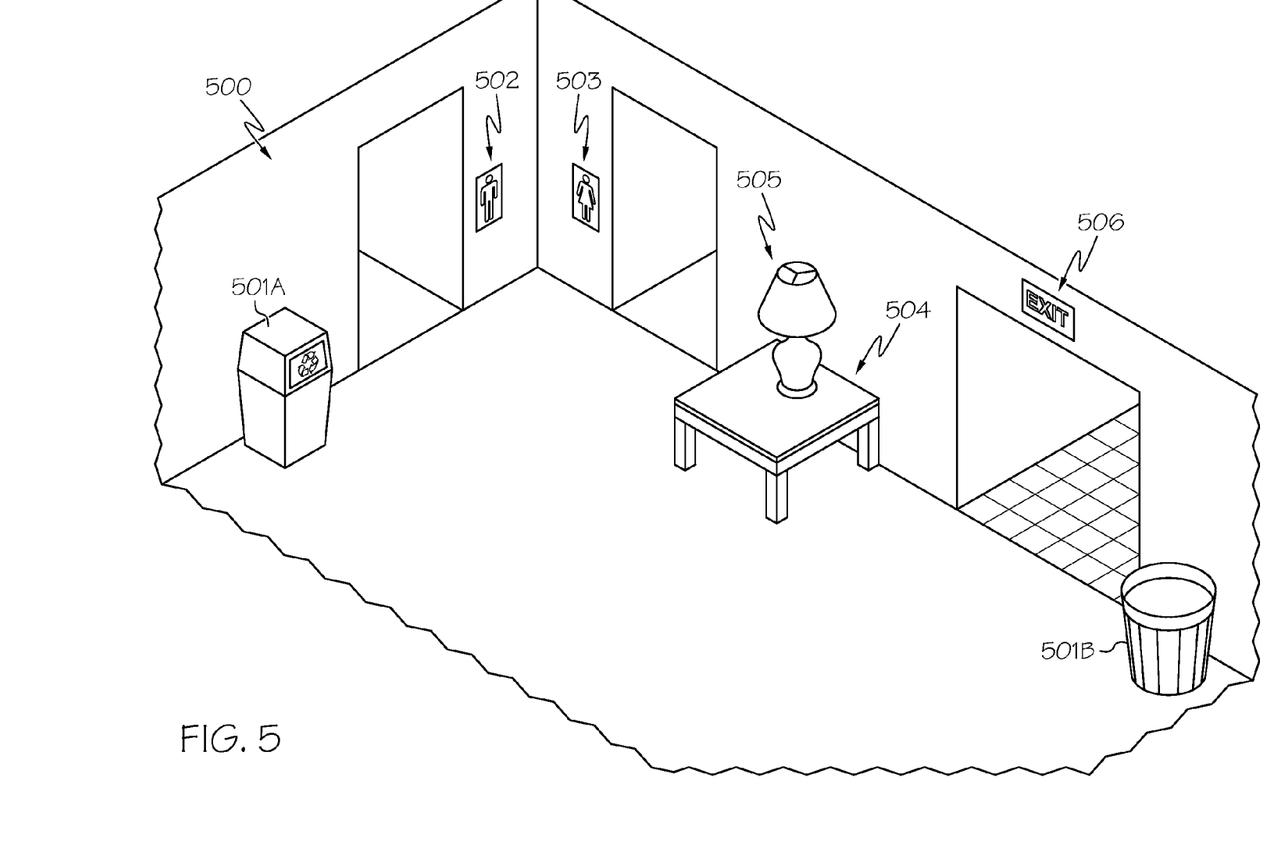
FIG. 5 schematically depicts an environment in which a user may navigate according to one or more embodiments shown and described herein.

Operation of a vision-assist device 100 will now be described. FIG. 5 depicts a scene or environment 500 in which the user may navigate. For example, the environment 500 may be a retail store. Several objects and features are present within the illustrated environment 500, such as a first trash can 501A, a second trash can 501B, a men's restroom as indicated by a men's restroom sign 502, a women's restroom as indicated by a women's restroom sign 503, a table 504, a lamp 505, and an exit as indicated by an exit sign 506. As the user navigates the environment 500, the vision-assist device 100 captures data from the sensors and classifies the environment.

Figure 6:
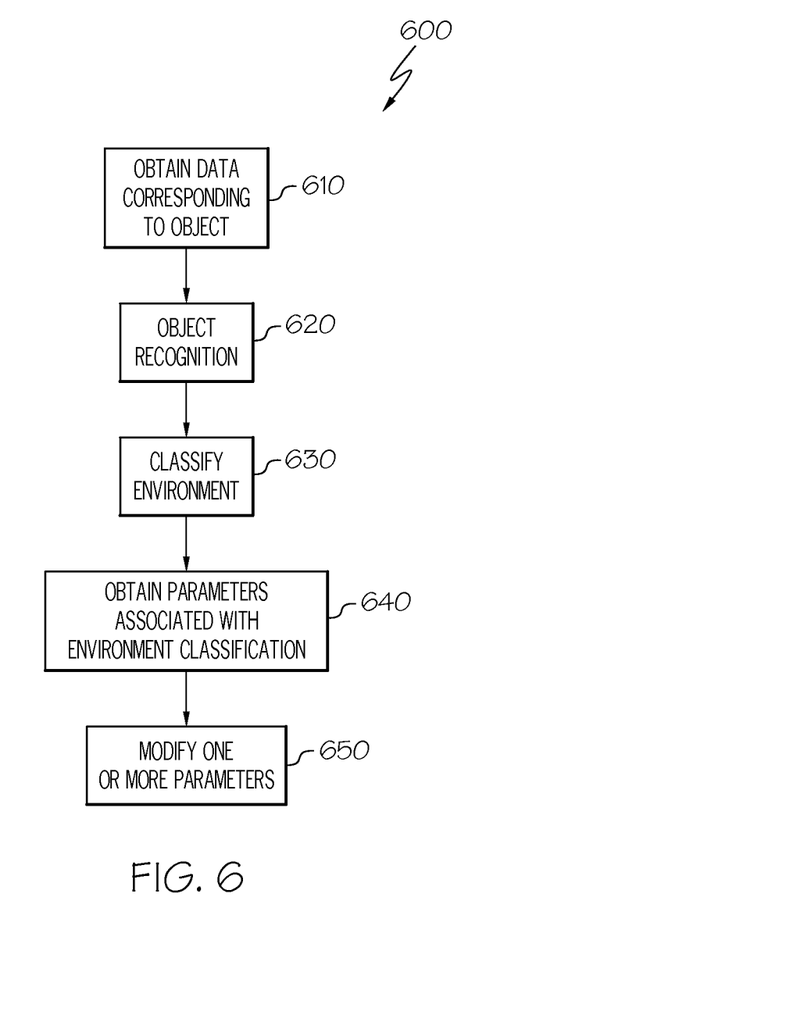
FIG. 6 graphically depicts a flowchart of classifying an environment according to one or more embodiments shown and described herein.

FIG. 6 illustrates a process 600 of modifying vision-assist device parameters according to an environment classification, such as the classification of the environment 500 shown in FIG. 5, for example. As the user navigates the environment 500, the vision-assist device 100 obtains data corresponding to an object at block 610. The obtained data is data generated by the one or more sensors included in the vision-assist device. As one example, the image device 300 can generate image data corresponding to an object present in the environment 500, such as the men's restroom sign 502. The data generated by the sensors may be stored in the memory component 140, for example.

Next, at block 620, the processor 110 accesses the data, and in accordance with the object recognition logic, performs one or more object recognition algorithms on the image data. For example, where at least one of the sensors is an image sensor, the object recognition logic detects one or more objects within the image data representing the scene.

Any known or yet-to-be-developed object recognition algorithms may be utilized to detect objects within the data corresponding to the environment. Example object recognition algorithms include, but are not limited to, edge detection algorithms, corner detection algorithms, blob detection algorithms, and feature description algorithms (e.g., scale-invariant feature transform ("SIFT"), speeded up robust features ("SURF"), gradient location and orientation histogram ("GLOH"), and the like). It should be understood that the phrase "object recognition algorithm" also includes facial recognition algorithms used to detect people present within image data.

At block 630, the classification of the environment is determined as a result of object correlation. The classification represents the type of environment that is detected based on the objects identified. For example, the data representing the environment 500 shown in FIG. 5 includes a men's restroom as indicated by a men's restroom sign 502, a women's restroom as indicated by a women's restroom sign 503, and an exit as indicated by an exit sign 506. Once these objects (the men's restroom sign 502, the women's restroom sign 503, and the exit sign 506) are recognized at block 602, the objects can be run through an object correlation algorithm to classify the environment. For example, the environment 500 may be classified as a retail environment.

Once the environment is classified, at block 640, the processor obtains parameters associated with the environment classification. The parameters may include, for example, a frequency of notifications provided by the vision-assist device 100, an allocation of processing capacity, a prioritization of processing, or a setting of an output mechanism (e.g., the audio device or the tactile feedback device). Each environment may have one or more parameters associated with its classification. The parameters may be associated with the environment classification by a programmer or manufacturer of the vision-assist device (e.g., the parameters for each environment classification may be hard coded into the vision-assist device), or the parameters may be associated with the environment classification by a user. Users may associate parameters with the environment classification by adjusting a setting, providing instructions to the vision-assist device to save the parameter in association with the environment classification, or by some other method of association. In various embodiments, the vision-assist device 100 may include one or more machine-learning algorithms configured to enable the vision-assist device 100 to learn the user's parameter preferences over time. For example, the vision-assist device 100 may learn that the user sets the volume of the audio device to silent when the user is in a restaurant because the user has set the volume of the audio device to silent the past three times he or she was in a restaurant. Accordingly, the vision-assist device 100 may associate the silent setting for the audio device with the restaurant environment classification.

In embodiments in which the parameters are set by the user (either directly or indirectly as a result of a machine-learning algorithm), the processor stores the user parameter modification information in one or more memories associated with the vision-assist device. Accordingly, responsive to classifying the environment, the processor accesses the user parameter modification information in order to retrieve the user parameter modification information corresponding to the classification of the environment.

Finally, the processor modifies one or more parameters for the vision-assist device 100 at block 650. As but one example, the processor can adjust a volume for the audio device or turn on the tactile feedback device. Where the processor has obtained user parameter modification information, the processor modifies the parameter(s) based at least in part on the user parameter modification information that corresponds to the environment classification. For example, where the user parameter modification information provides only a user preference for a volume level of an audio device, the processing allocation and other parameters for the environment classification may be modified according to default parameters associated with the environment classification.

Object correlation algorithms are not one hundred percent accurate and may misclassify an environment for a variety of reasons. Non-limiting reasons that environments may be classified incorrectly is low ambient light, errors in the generated data, similarity between different environments and/or the objects within them, and unfamiliarity with either the environment or the objects within it. Consider, for example, the environment 700 illustrated in FIG. 7.

Figure 7:
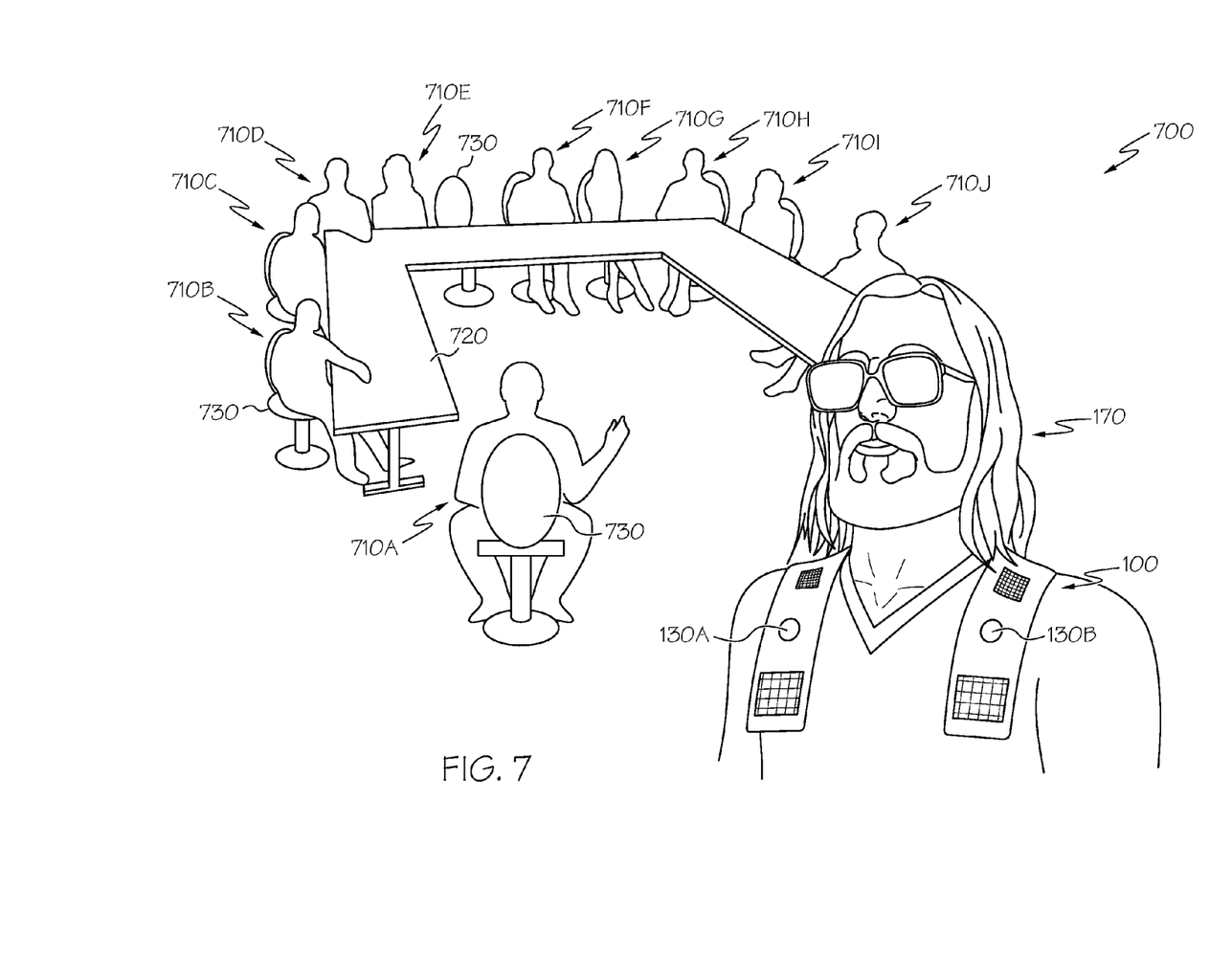
FIG. 7 schematically depicts another environment in which a user may navigate according to one or more embodiments shown and described herein.

In FIG. 7, the user 170 enters a room in which people 710A-710J are sitting at a table 720. The room may be a classroom or a conference room where a meeting is taking place, for example. The vision-assist device 100, via the sensors, generates data corresponding to one or more objects in the environment. For example, the image sensors 130A, 130B can generate image data. The vision-assist device 100 performs an object recognition algorithm on the image data and determines that there is a table 720, people 710A-710J, and several chairs 730 in the room. However, when the processor performs an object correlation algorithm on these objects, it may be unable to classify the environment with certainty. For example, the processor may be able to determine that the environment is a public environment of some sort, but may be unable to distinguish between a conference or classroom or a restaurant based on the items identified. Accordingly, in various embodiments, the object correlation algorithm produces a confidence value with respect to the classification of the environment based on the correlation of the first and second objects.

The confidence value represents a degree of confidence regarding whether or not the environment is the type of environment determined from the object correlation. The confidence value may range from a minimum value (i.e., lowest confidence) to a maximum value (i.e., highest confidence). Low confidence values are produced when the identified objects exist together in a large number of environments and where the object correlation cannot determine the proper classification for the environment. High confidence values are produced when the identified objects exist together in a small number of environments and where the object correlation is sure of the classification of the environment. In some embodiments, the confidence value is a percentage ranging from 0% as the minimum value to 100% as the maximum value. In other embodiments, the confidence value may not be in the form of a percentage, but rather a number on a predetermined scale (e.g., 0 to 1.0 or 0 to 20).

Because misclassifications for the environment may cause the vision-assist device 100 to alter one or more parameters in an undesirable way (e.g., the misclassification results in the audio volume being maximized when the user is in a quiet environment), various embodiments compare the confidence value with a confidence value threshold and modify parameters responsive to the confidence value being greater than or equal to the confidence value threshold.

Figure 8:
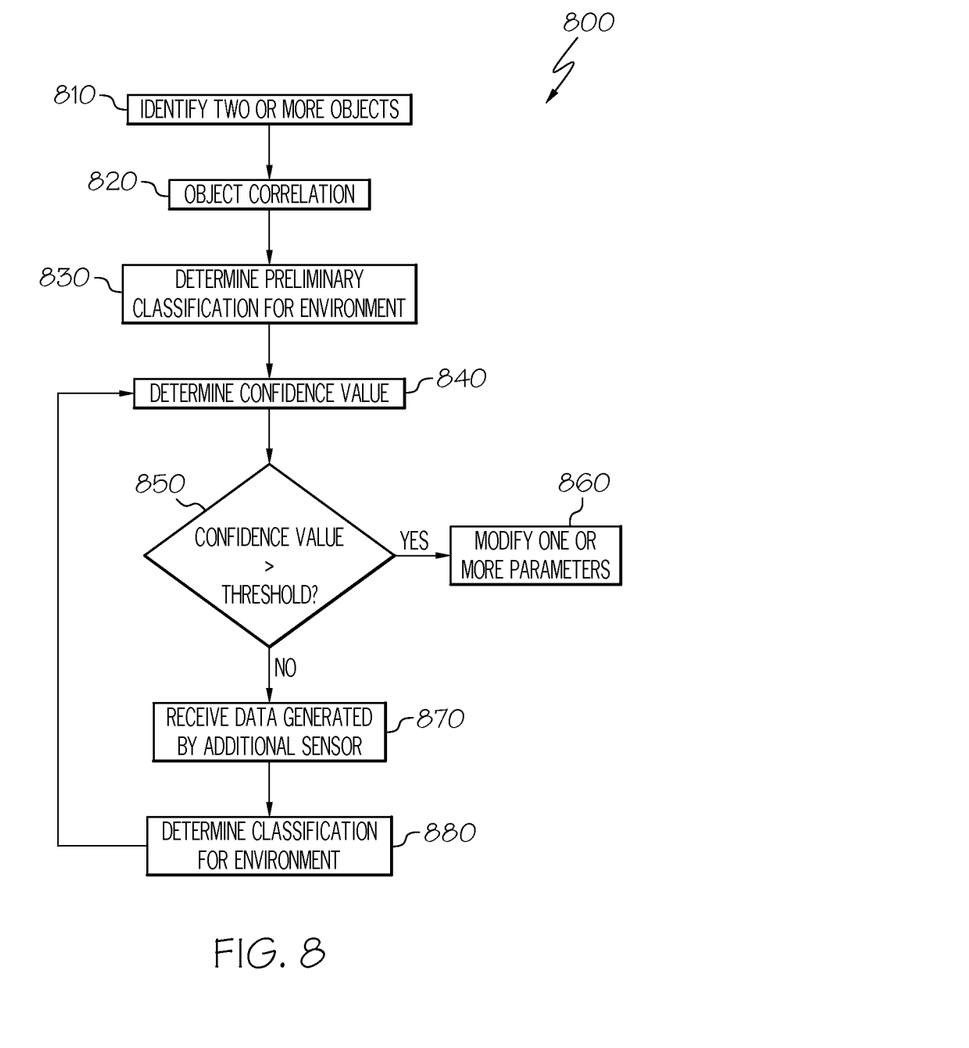
FIG. 8 graphically depicts a flowchart of modifying parameters based on a confidence value for the environment classification according to one or more embodiments shown and described herein.

FIG. 8 illustrates a process 800 of modifying vision-assist device parameters according to an environment classification and an associated confidence value, such as the classification of the environment 700 shown in FIG. 7, for example. As the user navigates the environment 700, the vision-assist device 100 identifies two or more objects at block 810. The objects can be identified by performing an object recognition algorithm on data corresponding to the objects that is generated by the sensors of the vision-assist device 100. For example, the vision-assist device 100 may identify the table 720 and chairs 730 along with several people 710A-710J using image data generated by the image sensors 130A, 130B. It should be understood that in general at least two objects should be recognized for processing by the object correlation algorithm. However, in some embodiments, the object correlation algorithm can be run on single objects where the object is unique and associated with only limited number of environment classifications. For example, recognition of a bowling pin may be sufficient to run the object correlation algorithm to satisfactorily determine that the environment is a bowling alley.

Once the vision-assist device 100 has identified the objects, at block 820, the processor runs an object correlation algorithm on the identified objects. The object correlation algorithm can be any known or yet-to-be-developed object correlation algorithms utilized to classify an environment according to objects present within the environment. At block 830, the processor determines a preliminary classification for the environment based on the object correlation algorithm. For example, based on the table 720, chairs, 730, and the people 710A-710J, the processor may determine that the environment 700 is a public place.

At block 840, the processor determines a confidence value for the preliminary classification. For example, although at block 830 the processor determined that the environment 700 was a public place, because the processor could not determine whether the public place was a cafeteria or a seminar, the processor may determine that the confidence value for the preliminary classification is low. Next, the processor compares the confidence value to a predetermined confidence value threshold at block 850. The confidence value threshold on a scale of 0% (minimum confidence value) to 100% (maximum confidence value) may be 51%, 60%, 70%, 75%, 80%, 85%, 90%, 95%, 97%, 98%, 99%, or greater depending on the particular embodiment. It should be understood that confidence value thresholds may vary depending on the confidence value scale implemented and the particular confidence value calculations employed. If, at block 850, the processor determines that the confidence value is greater than the confidence value threshold (e.g., a "yes" at block 850), the processor modifies on or more parameters at block 860. As described above with respect to FIG. 6, the particular parameters associated with a particular environment classification can vary depending on the particular embodiment, and may be associated with the environment classification via the device itself (through either hard coding or machine learning algorithms) or by the user. Although block 850 indicates that the confidence value should be greater than the confidence value threshold in order to modify the parameters for the vision-assist device, it should be understood that in various embodiments, the confidence value may be greater than or equal to the confidence value threshold in order to modify the parameters for the vision-assist device.

However, if the confidence value does not exceed the confidence value threshold (e.g., a "no" at block 850), the processor receives data generated by one or more additional sensors at block 870. For example, the processor may receive data from a microphone (not shown) associated with the vision-assist device 100. The microphone generates audio information for processing by the processor, which can be used to further classify the environment. For example, the audio data generated by the microphone may generate data that, when processed by the processor, indicates that the room has a low ambient volume and a single lecturer. As another example, a location sensor in the vision-assist device 100 can generate location information sufficient to identify the user's location on a map as being at a conference center. At block 880, the processor determines a classification for the environment based on the preliminary classification and the data from the additional sensor. The classification can be performed, as above, using an object correlation algorithm on the objects identified at block 810 and object that can be identified based on the additional data received at block 870. Alternatively, other classification algorithms may be employed, such as algorithms that apply a decision tree analysis to the data received to classify the environment. Continuing with the example, the processor may classify the environment as a professional conference.

Once the classification is determined at block 880, the processor returns to block 840 and determines a confidence value for the classification output by block 880. The processor compares the confidence value to the predetermined confidence value threshold at block 850 and either modifies one or more parameters (block 860; a "yes" at block 850) or receives additional data generated by the sensors (block 870; a "no" at block 850). In this manner, the visual-assist device can continue to gather data from the sensors and determine confidence values until it has enough data to classify the environment with a confidence sufficient to satisfy the confidence value threshold (i.e., the confidence value is greater than, or greater than or equal to, the confidence value threshold). For example, upon determining that the classification of the environment as a professional conference has an acceptable confidence value (e.g., the confidence value is greater than, or greater than or equal to, the confidence value threshold), the processor may set the audio device to mute, turn on tactile feedback, and allocate processing power to facial recognition of the speaker. In some embodiments, the vision-assist device 100 may also provide the user 170 with navigation instructions to the speaker during a break, navigation instructions to the restroom, or the like.

Having described in detail various embodiments of a vision-assist device 100 configured to modify one or more parameters based on an environment classification, consider the following examples, which may further describe the vision-assist device 100.

In one example, a user is wearing a vision-assist device that includes at least a camera and a location sensor, such as a GPS sensor. When the user enters an environment, the camera generates image data corresponding to the environment, and more specifically, data corresponding to one or more objects within the environment. The processor of the vision-assist device can apply an object recognition algorithm to the image data and identify books and people. Then, the processor applies an object correlation algorithm to the identified objects and determines that the classification for the environment is likely either a bookstore or a library. Because the confidence value for the classification of a bookstore may be low (e.g., below the confidence value threshold), the processor may obtain additional information from the GPS sensor. The GPS sensor, for example, may provide information indicating that a library is associated with the GPS location for the environment. Accordingly, the processor may mute the audio device. The vision-assist device 100 may also access a map of the library, provide navigation instructions to the user to a particular section of the library, and/or allocate processing power to an application to read books or other information to the user.

In another example, a user is wearing a vision-assist device that includes at least a camera and a microphone. When the user enters an environment, the camera generates image data corresponding to the environment, and more specifically, data corresponding to one or more objects within the environment. The processor of the vision-assist device can apply an object recognition algorithm to the image data and identify tables, chairs, plates, and glasses. Accordingly, the vision-assist device determines that a preliminary classification for the environment is a food establishment, but it may not be able to distinguish between a food court, a restaurant, or a private dining room on the basis of these identified objects. The processor then receives data generated by the microphone indicating that the ambient volume level is relatively low and there is soft music playing. The processor may use the data generated by the microphone along with the preliminary classification to determine that the environment is likely a restaurant. Additional data may be provided to the processor to further increase a confidence value associated with this classification. For example, the camera can provide information indicating that there is a low level of light that is more consistent with the lighting in a restaurant than with the lighting in a food court. Upon determining that the environment is a restaurant, the volume setting on the audio device may be decreased and the vision-assist device may provide notifications to the user on a less-frequent basis.

In some embodiments, one or more parameters may be adjusted on the basis of the preliminary classification while additional parameters may be adjusted on the basis of the more detailed classification. For instance, in the previous example, when the vision-assist device determines that a preliminary classification for the environment is a food establishment, the processor may increase a priority for recognition of certain objects, such as signs identifying the restaurant, wine glasses, cafeteria trays, or the like. Responsive to the processor identifying one or more of these items and further classifying the environment, additional parameters (such as notification settings and volume) of the vision-assist device can be modified.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A wearable vision-assist device configured to be wearable by a visually-impaired user about a neck and shoulder region of a visually-impaired user, the wearable vision-assist device comprising:
   an image sensor configured to generate image data corresponding to an environment surrounding the wearable vision-assist device;
   a location sensor configured to generate location data corresponding to the environment;
   an audio device;
   a tactile feedback device;
   a processor communicatively coupled to the image sensor, the location sensor, the audio device, and the tactile feedback device, the processor being programmed to:
   identify a first object and a second object present in the environment based on the image data;
   identify a preliminary classification of the environment based on the first and second objects using an object correlation algorithm; and
   modify a setting of the audio device or the tactile feedback device of the wearable vision-assist device based on the preliminary classification of the environment based on the first and second objects;

determine a classification of the environment based on at least the preliminary classification and the location data; and in response to the environment classification, modify an allocation of a processing capacity of the processor via a modification of allocation with respect to and between at least the audio device and the tactile feedback device, wherein the modification of allocation is based on the environment classification.

2. The vision-assist device of claim 1, the wearable vision-assist device further comprising one or more sensors comprising a microphone, an accelerometer, a gyroscope, or an inertial measurement unit.

3. The vision-assist device of claim 2, wherein:
the inertial measurement unit is configured to track at least an environmental speed of the environment surrounding the user,
and the preliminary classification of the environment is further based on inertial measurement information from the inertial measurement unit comprising at least the environmental speed.

4. The wearable vision-assist device of claim 1, wherein the setting of the audio device corresponds to a volume level associated with the audio device.

5. The wearable vision-assist device of claim 1, wherein:
the processor is programmed to modify a prioritization of processing based on the environment classification.

6. The wearable vision-assist device of claim 1, wherein the processor is programmed to determine a confidence value based on a correlation of the first and second objects.

7. The wearable vision-assist device of claim 6, the wearable vision-assist device further comprising a third sensor configured to generate data corresponding to the environment, wherein the processor is programmed to identify the preliminary classification of the environment based on the first and second objects using the object correlation algorithm and the data generated by the third sensor responsive to the confidence value being below a predetermined confidence value threshold.

8. The wearable vision-assist device of claim 6, wherein the processor is programmed to determine the confidence value based on the correlation of the first and second objects and the location data.

9. The wearable vision-assist device of claim 6, wherein the processor is programmed to modify the setting of the audio device or the tactile feedback device responsive to the confidence value being greater than or equal to a predetermined confidence value threshold.

10. The wearable vision-assist device of claim 6, wherein the processor is programmed to modify a setting of the audio device or the tactile feedback device of the wearable vision-assist device based on the preliminary classification of the environment based on the one or more objects.

11. The wearable vision-assist device of claim 10, wherein the processor is programmed to determine a confidence value based on a correlation of the one or more objects, and wherein the processor is programmed to modify the setting of the audio device or the tactile feedback device responsive to the confidence value being greater than or equal to a predetermined confidence value threshold.

12. The wearable vision-assist device method of claim 11, further comprising modifying at least one parameter of the wearable vision-assist device based on the classification of the environment based on the first and second objects, wherein the at least one parameter of the vision-assist device comprises at least one of a frequency of notifications provided, the allocation of processing capacity, a prioritization of processing, and a setting of an output mechanism, wherein the setting is one of audio and tactile.

13. The method of claim 11, further comprising modifying a setting of an audio device of the wearable vision-assist device or an tactile feedback device of the wearable vision-assist device based on the preliminary classification of the environment based on the first and second objects.

14. The wearable vision-assist device of claim 1, wherein the processor is programmed to modify at least one parameter of the wearable vision-assist device based on based on the preliminary classification of the environment based on the first and second objects, wherein the at least one parameter of the vision-assist device comprises at least one of a frequency of notifications provided, the allocation of processing capacity, and a prioritization of processing.

15. The wearable vision-assist device of claim 14, wherein the processor is programmed to:
store user parameter modification information;
access the user parameter modification information to retrieve user parameter modification information corresponding to the classification of the environment; and
modify the at least one parameter based at least in part on the user parameter modification information corresponding to the classification of the environment.

16. The vision-assist device of claim 14, wherein the processor is further programmed to:
determine a confidence value of the preliminary classification of the environment based on the first and second objects;
determine the confidence value is acceptable in response to the confidence value being greater than or equal to a confidence value threshold; and
modify the at least one parameter based on determining the confidence value is acceptable.

17. The wearable vision-assist device of claim 1, wherein:
based on the preliminary classification, the processor is programmed to increase a priority for recognition of one or more objects associated with the preliminary classification.

18. A wearable vision-assist device configured to be wearable by a visually-impaired user about a neck and shoulder region of a visually-impaired user, the wearable vision-assist device comprising:
an image sensor configured to generate image data corresponding to an environment surrounding the wearable vision-assist device;
a location sensor configured to generate location data corresponding to the environment;
an audio device;
a tactile feedback device;
a processor communicatively coupled to the image sensor, the location sensor, the audio device, and the tactile feedback device, the processor being programmed to:
identify one or more objects present in the environment based on the image data;
identify a preliminary classification of the environment based on the one or more objects using an object correlation algorithm;
determine a classification of the environment based on at least the preliminary classification and the location data; and
in response to the environment classification, modify an allocation of a processing capacity of the processor via a modification of allocation with respect to and between at least the audio device and the tactile feedback device, wherein the modification of allocation is based on the environment classification.

19. The vision-assist device of claim 18, wherein the processor is programmed to modify at least one parameter of the wearable vision-assist device based on the preliminary classification of the environment based on the one or more identified objects, wherein the at least one parameter of the vision-assist device comprises at least one of a frequency of notifications provided, the allocation of processing capacity, and a prioritization of processing, and a setting of an output mechanism, wherein the setting is one of audio and tactile.

20. A method of environment classification with a wearable vision-assist device configured to be wearable by a visually-impaired user about a neck and shoulder region of a visually-impaired user, the method comprising:

generating, through an image sensor of the wearable vision-assist device, image data corresponding to an environment surrounding the wearable vision-assist device;

generating, through a location sensor of the wearable vision-assist device, location data corresponding to the environment;

identifying a first object and a second object present in the environment based on the image data;

identifying a preliminary classification of the environment based on the first and second objects using an object correlation algorithm; and determining a classification of the environment based on at least the preliminary classification and the location data; and in response to the environment classification, modifying an allocation of a processing capacity of the processor via a modification of allocation with respect to and between at least the audio device and the tactile feedback device, wherein the modification of allocation is based on the environment classification.

* * * * *

UNITED STATES PATENT AND TRADEMARK OFFICE
CERTIFICATE OF CORRECTION

PATENT NO. : 10,217,379 B2
APPLICATION NO. : 14/609986
DATED : February 26, 2019
INVENTOR(S) : Joseph M. A. Djugash It is certified that error appears in the above-identified patent and that said Letters Patent is hereby corrected as shown below:

On the Title Page

Item (56), References Cited, U.S. Patent Documents, Column 02, Cite No. 5, delete "Ramnath Krishman et al." and insert -- Ramnath Krishnan et al. --, therefor.

Signed and Sealed this
Seventh Day of May, 2019

Andrei Iancu
*Director of the United States Patent and Trademark Office*